C. B. BARTLEY.
PROCESS OF STERILIZING FLUIDS.
APPLICATION FILED AUG. 5, 1908.
930,023.
Patented Aug. 3, 1909.
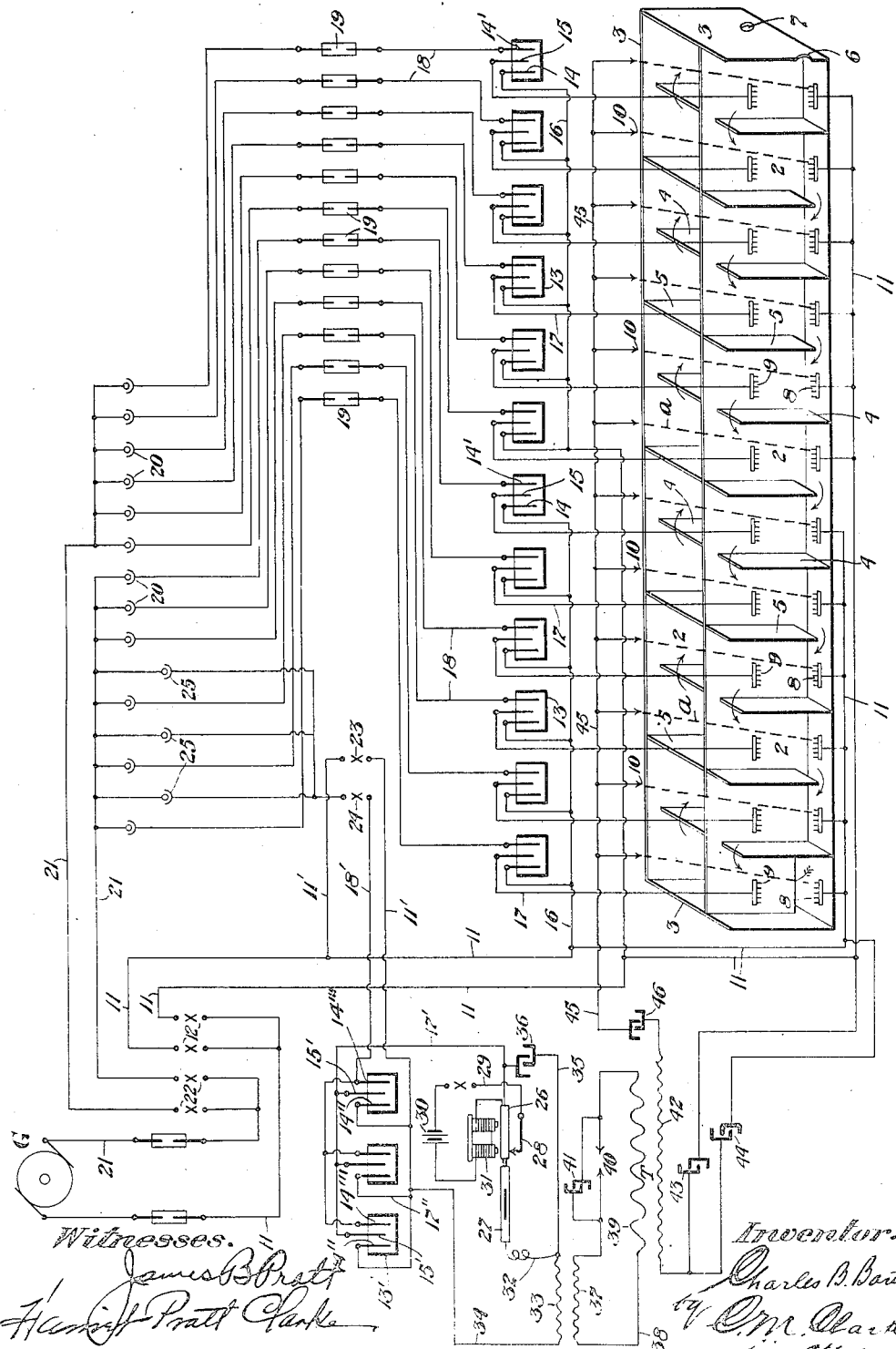
Witnesses.
James B Pratt
Harriet Pratt Clarke
Inventor.
Charles B. Bartley
by C. M. Clarke
his attorney

UNITED STATES PATENT OFFICE.

CHARLES B. BARTLEY, OF PITTSBURG, PENNSYLVANIA.

PROCESS OF STERILIZING FLUIDS.

No. 930,023.   Specification of Letters Patent.   Patented Aug. 3, 1909.

Application filed August 5, 1908. Serial No. 447,166.

*To all whom it may concern:*

Be it known that I, CHARLES B. BARTLEY, a citizen of the United States, residing at Pittsburg, in the county of Allegheny and State of Pennsylvania, have invented certain new and useful Improvements in Processes of Sterilizing Fluids, of which the following is a specification, reference being had therein to the accompanying drawing.

My invention refers to a process for the purification of water or other fluids or gases by electricity and consists in the method of subjecting the water in stages to the operation of a combined constantly traversing current and a co-acting intermittent spark gap of high frequency, or to a series of such currents and spark gaps corresponding to the stages, in the manner hereinafter described.

In the drawings accompanying the invention I have shown a diagrammatic arrangement of the circuit connections, terminals, etc., and a sectional view of the water tank, illustrating the process.

In said drawings, the tank is shown as comprising a plurality of cells 2 within outer inclosing walls 3 of any suitable construction or dimensions, the cells 2 being arranged in series and divided by partitions 4, 5, the partitions 4 extending upwardly from the bottom to a point below the top of the tank, partitions 5 extending from the top of the tank downwardly to within a short distance of the bottom, said partitions alternating so as to produce an undulating flow of the water throughout. That is to say, when the water is introduced into one end of the tank from a supply pipe 6 it flows upwardly over the top of partition 4 into the next adjacent cell 2, downwardly under partition 5 to the next adjacent cell, upwardly over the next partition 4 and then downwardly, and so on through the entire series of cells to the point of exit.

As represented in the drawings, the cells may be arranged in two rows side by side, the partition between the end-most cells having the underflow opening as shown, whereby the water may be passed to the end cell of the next series and then backwardly in the same manner to the last cell and outwardly therefrom through a suitable outlet opening 7. By this arrangement the entire volume of water passes through the series of cells in stages, i. e., the entire volume contained within the series of cells is divided by the several partitions into volumes defined by the cell cavities, each of such volumes, in the construction shown, being subjected to the sterilizing effect of the direct current and disruptive discharge, whereby the whole volume of water in passing through the cells is successively operated upon at closely adjacent intervals.

In carrying out the invention, which has in view to sterilize the water electrically by the use of electric currents, either A. C. or D. C., I have found that the best results as to the precipitation of germs and other impurities are secured by the use of the D. C. Inasmuch as the great majority of available currents are of the A. C. type, the invention involves the use of rectifiers with A. C. currents, for which purpose I employ potash cells for both the constant and spark gap currents together with the other electrical elements and installation shown in the diagram and as hereinafter described.

Within each cell 4 and 5 respectively are mounted the terminals 8, 9, respectively, both submerged below the water at bottom and top and adapted to transmit the constant D. C. current therethrough. Arranged some distance above the normal water level of each cell is a spark gap terminal 10, the spark gap being indicated between said terminal and the terminal 8, at *a*. Terminals 8 are connected with one pole of the generator G, preferably in series of six each, by common trunk line conductors 11 through suitable switches or other make-and-break mechanism 12.

13 represents a series of potash cells provided with anodes 14, 14, of aluminum and intervening cathodes 15 of copper oxidized. Anodes 14 are connected by branch line 16 with trunk lines 11 leading to lower terminals 8, while cathodes 15 are connected directly by conductors 17 with the upper terminal 9. The other anodes 14' are connected by conductors 18, mercury tubes 19 and lamps 20 and trunk line conductors 21 through suitable switches or other make-and-break elements 22, with the other pole of generator G. Mercury tubes 19 are inserted in the circuits of any predetermined tension in the well known manner of mercury tubes when used for such purpose, the lamps 20 acting to interpose suitable resistance. By this arrangement it will be seen that alternating currents pass from one side of the generator through said elements and the potash cells and finally to the upper terminals 9 to be converted into direct currents.

11' is a branch conductor leading off from conductor 11 of the generator and connected through suitable switches or other devices 23 and branch connections 17'' with anodes 14'' of a separate series of potash cells 13' for rectifying the other side of the current for terminals 8, while the other anodes 14''' of said series of potash cells 13' are connected by said conductors 18' through suitable switches or other devices 24 and lamps or resistance 25, with the main trunk conductor 21 leading to the other pole of the generator, as described. The copper oxidized cathodes 15' of cells 13' are connected by conductors 17' to an armature 26. Said armature 26 is provided with a tilting mercury tube 27 adapted to open and close the circuit therethrough, a contact terminal 28 connected with one pole 29 of a local battery 30, and an energizing magnet 31 connected with the other pole of said battery, as shown in the diagram. Mercury tube 27 is connected by a terminal 32 with the primary element 33 of an induction coil connected by conductor 34 at the other end with the conductor 11', and also by branch conductors 17'' with the anodes 14'' to establish a return through the potash cells. The induction coil is also connected by conductor 35 with one side of the condenser 36, also connected with branch conductor 17'', to establish connection with the cathode 15' of the potash cells 13'. The secondary electrode 37 of the induction coil is connected by conductor 38 with the primary 39 of a Tesla oscillating coil T, the other terminal of said electrode 37 and primary 38 having secondary electrodes 40 and an interposed condenser 41.

42 represents the secondary electrode of the Tesla oscillating coil T of 10000 ohms, while in series with the secondary 42 are condensers 43, 44, for both outlets 11, 11, of the lower terminals 8, to prevent the direct current from running back to the secondary coil 42, each condenser controlling the series of six spark gaps. In the return conductor 45 of spark gap terminals 10 is inserted a condenser 46 connected with the other terminal of the secondary 42 of the Tesla oscillating coil T. By this construction, it being a fact that a D. C. will not flow through the condenser, I form a make-and-break in the primary coil to set up oscillations in the secondary coil, thereby giving a static discharge across the secondary electrodes 40, which are strapped across the condensers 41.

The primary electrode 39 of the Tesla oscillating coil T is in six turns of No. 10 copper wire, opposing secondary coil 42 of 10000 ohms. On the return of the spark gap current from the terminals 10 above the water tanks, to said secondary coil 42, and during the transmission of the direct current through the water in the compartment 2, of high resistance and resulting limited electrical flow, the spark gap in each compartment creates ozone or allotropic gas.

The operation of the invention is carried on continuously, the water flowing successively through the several cells or compartments and being subjected in each to the sterilizing process of the direct current and spark gap, finally flowing outwardly as described. The sterilization is thus rendered thorough and complete, the operation is progressive and results in complete precipitation of all impurities and thorough sterilization of the water.

It will be understood that the number of cells, their dimensions, arrangement, etc., may be varied and that the electrical installation may be changed or modified by an electrician to suit varying conditions as to volume or quality. Where D. C. currents are available, it will be understood that the rectifying potash cells may be dispensed with, thereby simplifying the installation. The process is valuable in purifying any fluids or gases and will be found to give satisfactory results in practice.

What I claim is:—

1. The process of sterilizing fluids consisting in establishing a direct current through the medium to be sterilized between immersed current terminals and simultaneously inducing a disruptive discharge through said medium and the atmosphere between an immersed terminal and an outer terminal, substantially as set forth.

2. The process of sterilizing fluids consisting in establishing in stages through the medium to be sterilized a series of direct currents between immersed current terminals and simultaneously inducing a corresponding series of disruptive discharges through said medium and the atmosphere between immersed terminals and outer terminals, substantially as set forth.

In testimony whereof I affix my signature in presence of two witnesses.

CHARLES B. BARTLEY.

Witnesses:
C. M. CLARKE,
CHAS. S. LEPLEY.